NON-LINEAR MICROWAVE ELEMENT BASED ON CHARGE DEPLETION

Filed March 31, 1960

*INVENTOR,*
EDWIN LANGBERG
*BY* Jack H. Linscott
ATTORNEY.

United States Patent Office 2,974,223
Patented Mar. 7, 1961

2,974,223

NON-LINEAR MICROWAVE ELEMENT BASED ON CHARGE DEPLETION

Edwin Langberg, Cambridge, Mass., assignor to the United States of America as represented by the Secretary of the Army Filed Mar. 31, 1960, Ser. No. 19,135

7 Claims. (Cl. 250—20)

This invention relates to systems and devices for translating or controlling high frequency electrical signals, and particularly to such systems and devices employing a semiconductor as the main control element.

A semiconductor is an electronic conductor whose resistivity at room temperature is in the range of $10^{-2}$ to $10^{9}$ ohm-cm., which is between metals and insulators. Electrical conduction in such semiconductors is by electrons (negative charges) and holes (positive charges). The number of free electrons in a semiconductor is small compared with metal so that the energy bands are almost entirely full or almost entirely empty except for a few electrons and holes created by thermal excitation or by the presence of impurities. The relatively small number of carriers can be significantly changed by strong electric field at the semiconductor boundary. Such a charged density modulation provides the basis for the invention to be described herein.

A general object of the invention is to produce efficiently and economically different types of control of electromagnetic signal energy in the microwave and millimeter-wave regions.

Related but more specific objects are to provide with simple and economical apparatus detection, electron beam deflection, frequency mixing or frequency multiplication of electrical signals in the microwave or millimeter-wavelength region.

Such control of the high frequency electrical signals is attained mainly by variation of the conduction characteristics of a semiconductor body near the transmission path of said signals. More specifically, the devices in accordance with the invention effect such control by utilization of the majority charge depletion due to a strong, normal electric field component in a thin wafer of a suitable semiconductive material inserted along the boundary of a waveguide or other high frequency transmission medium over which the high frequency signals to be controlled are propagated. This depletion will result in non-linear effects on wave-transmission through the semiconductor wafer and in the wafer, which effects are utilized to provide different types of control of the propagated signals dependent on their characteristics and that of the associated electric field.

Figure 1:
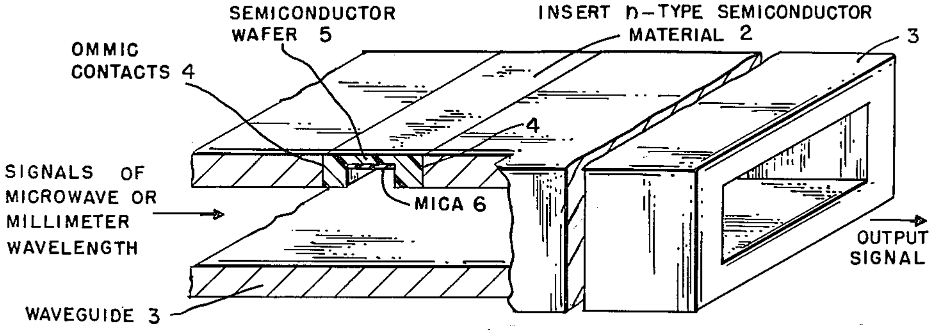
Figure 2:
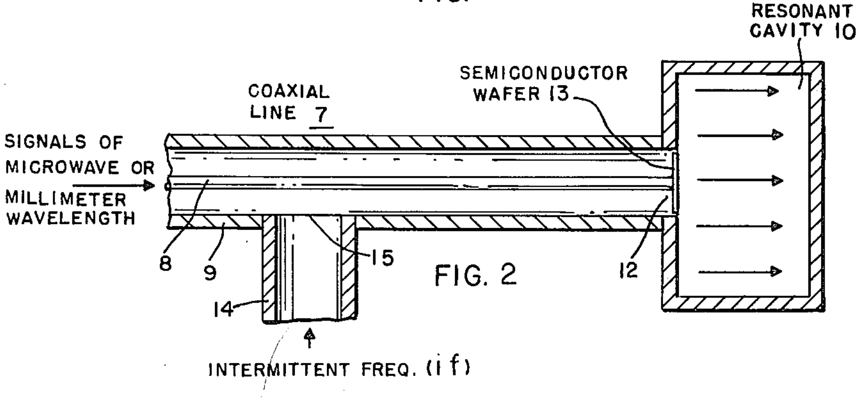
Figure 3:
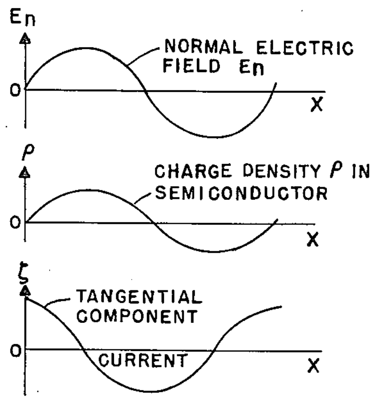
Figure 4:
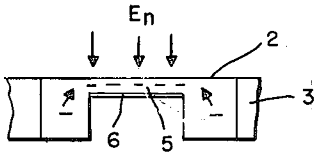
Figure 5:
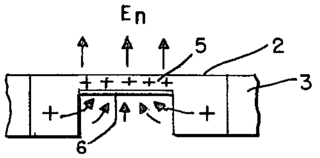
Figure 6:
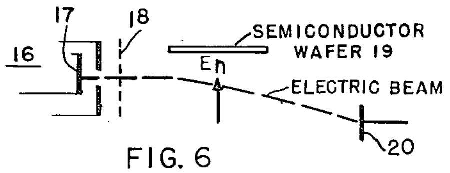

The various objects and features of the invention will be better understood from the following complete description thereof when it is read in conjunction with the several figures of the accompanying drawings, in which:

Figs. 1 and 2 respectively show a perspective view (partially broken away to show construction) and a longitudinal sectional view of different embodiments of the device of the invention applied to different types of transmission line;

Figs. 3, 4 and 5 respectively show curves, and diagrammatical representations of a portion of the embodiment of Fig. 1, used in connection with a description of the theory of operation of that embodiment; and Fig. 6 shows diagrammatically the application of the embodiment of Fig. 1 to the deflection of an electron signal beam.

An electric vector of an electromagnetic wave traveling along a good (but not ideal) conductor has two components, one a large normal component which induces charge in the conductor boundary, and the other a small tangential component which drives the current necessary to shift the charges with the propagated wave (Fig. 3). Under ordinary circumstances of thick metallic boundaries, the normal component $E_n$ of the electric field is always fully neutralized by the induced charge.

It is important to distinguish the above-mentioned effect from the skin depth phenomenon which is caused by the tangential component of the field driving the current back and forth. For example, the skin depth $d$ for copper (Cu) at 10K mc. is $7.6\times10^{-5}$ cm. The depth of penetration 1 of the normal E field, on the other hand, depends on the magnitude of that field and the charge density $\rho$: $1=\xi E/\rho$, where $\xi$ is the dielectric constant of the semiconductor. Assuming the carrier density $n=10^{21}$ cm.$^{-3}$ for Cu, and $E=10^{4}$ v./cm., (volts/cm.), then $1=6\times10^{-12}$ cm. Physically, this means that in metals even the strongest normal fields will be fully compensated by the slightest displacement of the conduction electrons in the top atomic layers.

The situation is quite different in the case of a semiconductor. For example, an n-type semiconductor, that is, an extrinsic semiconductor in which the conduction electron density exceeds the hole density because of donor impurities, with a carrier density $n=4\times10^{14}$ donors per cc. and $E=10^{4}$ v./cm., will have a depth of penetration $1=1.4\times10^{-5}$ cm.=1400 Angstroms (A.), which corresponds to several hundred atomic layers. It is possible to form such a layer on top of a dielectric material, for example, mica, using known evaporation or sputtering techniques. A thin semiconductor wafer so made subjected to a strong electric field will exhibit a majority charge depletion due to the normal electric field component. The non-linear impedance characteristics of such a semiconductor wafer is the basis of the present invention. Two general embodiments of this principle will be described:

(1) Non-linear transmission of the electromagnetic wave through the semiconductor wafer; and (2) Impedance (conductivity) modulation of this wafer.

A first device in accordance with the invention utilizing this principle is illustrated in Fig. 1. As shown therein, this device includes an n-type semiconductor insert 2, such as one made from n-type germanium (Ge), at an intermediate point along a wave boundary, for example, connected in one wall of a section 3 of metal, hollow-pipe waveguide of rectangular cross-section over which the electromagnetic signal wave of microwave or millimeter frequency to be controlled is propagated longitudinally. The insert 2, which has a length of about a wavelength ($\lambda$) of the propagated wave, is joined at its ends to the metal walls of the waveguide sections 3 by suitable ohmic contacts 4. A central portion of the semiconductor insert 2 comprises a thin wafer 5 of the same semiconductive material (having a length $\lambda/2$) formed on top of a sheet 6 of mica or other dielectric material by any suitable means. The output signals representing the input signals modified by the wafer 5 are taken off from the output end of the waveguide section 3.

In the device of Fig. 1, when the electric field produced by the propagated electromagnetic wave is as shown in Fig. 4, the mobile (negative) electrons will flow from the thick parts of the semiconductor insert 2 to the wafer 5, and the normal field component $E_n$ will be fully shielded. When the polarity of the field is reversed, the mobile electrons will flow out and, assuming the effect of the hole current is small, the positive charge due to the ionized donors is insufficient to shield the field. As shown in Fig. 5, the electric field in this case will penetrate the wafer 5. Hence, the region on the outside of this wafer has a pulsating field component $E_n$ of one polarity only.

There are two distinct approaches of the invention combined in this application, depending on the type of wave propagated. One involves only electromagnetic waves. The non-linear semiconductor wafer 5 acts in this connection in the same way as a microwave crystal diode in that it offers a higher resistance to currents in one direction than to currents in the opposite direction. The significant difference is that the non-linear element (wafer 5) in this case is built into the wall of the waveguide (or cavity) 3, which avoids many problems connected with diode mounts. This approach can be useful for harmonic generation, frequency multiplication and mixer operation. The operation in each case is based on the majority charge depletion due to a strong, normal electric field which results in non-linear wave transmission through the wafer and in conductivity modulation of the wafer. Since the transmitted field is in pulse form, its harmonic content is high and the waves in the output of the wafer 5 will contain components harmonically related to the frequency of the propagated wave, desired ones of which may be selected by suitable tuning of the output circuit. The device may be also used for mixing the frequencies of a number of electromagnetic waves of different frequency from separate sources supplied over the line 3 to obtain waves of combination frequencies. It should be noted that the high frequency limit is determinated by the relaxation time of the majority carrier in the semiconductor which is in the order of $10^{-12}$ seconds. The device of Fig. 1 is thus useful up to wavelengths in the sub-millimeter region.

A second embodiment of the non-linear device in accordance with the invention is illustrated in Fig. 2. As shown therein, this device includes a main coaxial line 7 having an inner conductor 8 and an outer conductor 9, feeding at one end into a resonant cavity 10 formed in a metal hollow-pipe waveguide 11 of rectangular cross-section through an opening 12 in one broad wall of the guide 11. A thin semiconductor wafer 13, similar to the wafer 5 in the device of Fig. 2, is affixed to the end of the metal inner conductor 8 of line 7 projecting into the opening 12 and serves both as a portion of the boundary of the cavity 10 and a termination for the coaxial line 7. A branch metal hollow-pipe waveguide 14 of circular cross-section, disposed so that its longitudinal axis is perpendicular to the longitudinal axis of line 7, is coupled at one end to the coaxial line 7 at an intermediate point along its length through an opening 15 in the outer conductor 9 of that line.

The electromagnetic signal of microwave or millimeter wavelength to be controlled is applied to the free end of coaxial line 7 and is propagated longitudinally over that line to the resonant cavity 10 through the semiconductor wafer 13, and the wave of intermediate frequency from an auxiliary oscillator is applied to the main line 7 through the branch line 14 and is also transmitted over the main line 7 to the wafer 13. As a result of the majority change depletion due to the strong electric field component $E_n$ in the cavity 10 produced by the propagated electromagnetic wave, the conductivity of the termination (semiconductor wafer) 13 changes and results in cross-modulation of the two signals on the transmission line. The resonant cavity 10 would be tuned to select the desired combination frequency.

It is important that the junction between the semiconductor wafer 13 and the end of the metal inner conductor 8 of the coaxial line 7 is made such that it does not inject minority carriers into the wafer 13, since this would prevent the required majority charge depletion in the wafer 13. The device of Fig. 2 can also be used as a detector for detecting the signal modulation on a signal-modulated R.-F. carrier wave impressed on the input of the coaxial line 7.

Another combination of the invention involving the use of an electron beam is illustrated in Fig. 6. As shown thereon, an electron beam formed by an electron gun 16 including a cathode 17 for emitting the electrons thermionically, a modulating grid 18 for controlling the number of electrons that flow in the beam and the usual electron-optical means (not shown) for focusing the beam, is radiated into space in a given direction. A thin semiconductor wafer 19, similar to the wafer 5 of Fig. 1, and placed in a wave-guide as shown in Fig. 1 extending longitudinally in a direction parallel to the longitudinal axis of the beam is disposed at some point along the beam boundary and produces a strong, pulsating (one polarity) normal field component $E_n$ in the region outside the wafer traversed by the beam. This normal field will result in a deflection of the beam, the amount of deflection depending on the strength of the field. This deflection is translated into terms of signal modulation by providing two or more collecting anodes 20 at a receiving point for receiving the deflected beam. The current to the respective anodes will depend on the amount of deflection. In one variation of this idea, there is no intensity modulation of the electron beam. Because of the pulsating nature of the electric field near the semiconductor wafer 19, there will be a net deflection of the electron beam depending on the amplitude of the microwave signal. Consequently, the current received by the deflected beam will be a measure of the signal amplitude, and the whole device will act as a detector. Variations of the method are possible, i.e., the beam itself may be intensity-modulated by a signal from a local oscillator applied to the modulating grid 18, in which case the device may be used as a mixer to produce a wave of combination frequency.

Various modifications of the arrangements illustrated and described, which are within the spirit and scope of the invention, will occur to persons skilled in the art.

What is claimed is:

1. A device for controlling high frequency signal waves comprising a high frequency transmission medium over which such waves are propagated longitudinally, a thin wafer of semiconductive material inserted at a given point along the wave boundary of said medium so as to be out of the direct path of the propagated waves but subjected to the electric field produced by said waves, said wafer in response to the strong, normal electric field component exhibiting a majority charge depletion proportional to the strength of the electric field resulting in non-linear transmission of the waves through said wafer and impedance modulation thereof and output means for translating the resulting waves appearing in said medium in the output of said wafer into electric variations proportional to a component of the propagated waves.

2. The control device of claim 1, in which said medium is metal hollow-pipe waveguide, signal-modulated carrier waves of a frequency within the microwave or millimeter-wavelength region are propagated longitudinally over said waveguide, said waveguide including an insert in the outer wall thereof made solely from n-type semiconductive material, and having a length of about a wavelength of said frequency, an intermediate portion of said insert including said wafer made from a thin layer of the same semiconductive material deposited on a sheet of dielectric material, having a length less than a half-wavelength of said frequency in the direction of wave propagation, said wafer due to the non-liner effects produced in response to the normal, electric field component of said waves operating as a detector to detect in said output means the signal modulation on said carrier waves.

3. The control device of claim 1, in which the propagated waves are electromagnetic signal pulses in the microwave or millimeter-wavelength region, said medium is a metal hollow-pipe waveguide, said wafer is inserted in the outer wall of said waveguide and has a length equal to or less than a half-wavelength of the frequency of the propagated pulses in the direction of their propagation, and, since the electric field of said waves controlling said wafer are in pulse form so that its harmonic content is high, said wafer acts as a frequency multiplier to multiply the frequency of the propagated waves, and said output means is tuned to select a wave of a desired multiplied frequency from the waves appearing in the output of said wafer.

4. The control device of claim 1, in which said medium comprises a transmission line feeding into a resonant cavity, said wafer being affixed to the output end of said transmission line in such manner that it acts as a termination thereof and a portion of the wave boundary of said cavity, said waves propagated over said line comprising two or more signal microwaves of different frequencies, the majority charge depletion in said wafer due to the applied strong normal electric field component produced in said cavity by the propagated waves changing the conductivity of the termination of said line and resulting in cross-modultion of the signal microwaves of different frequencies on the transmission line, and said resonant cavity is tuned to select a wave of a desired combination frequency from the cross-modulation products.

5. The device of claim 1 used as a mixer for combining a high frequency signal wave with a signal wave of intermediate frequency to produce waves of combination frequency, in which said medium includes a metal hollow-pipe waveguide of rectangular cross-section with a resonant cavity formed in the interior thereof, a section of metal coaxial line having an outer and an inner conductor, feeding into said resonant cavity through an opening in one broad wall of said rectangular waveguide and a branch hollow-pipe waveguide feeding at one end into said coaxial line section at an intermediate point therein through an opening in the outer conductor, said thin wafer is attached to the end of said inner conductor projecting into said opening in said one broad side of said first waveguide so that it acts both as a boundary of said cavity and a termination of said coaxial line section, said high frequency signal waves propagated over said medium including a high frequency signal wave which is applied to the other end of said coaxial line section and a wave of intermediate frequency applied through said branch waveguide to said coaxial line section, the change in conductivity of said line termination as a result of the majority charge depletion produced in said wafer due to the strong normal electric fields produced in said cavity by the propagated waves causing cross-modulation of these waves on said coaxial line section, and said resonant cavity is tuned to select a wave of the desired combination frequency from the cross-modulation products.

6. The control device of claim 1, in which said waves propagated over said medium are utilized to cause deflection of an electron beam varying in amplitude in accordance with signals, said wafer of semiconductive material being disposed at a given point along the wave boundary of said medium and near the outer edge of said beam and having a length of less than a half-wavelength of said frequency in the direction of wave propagation, the pulsating electric field of one polarity which in non-linear fashion penetrates through said wafer being utilized to deflect said beam by an amount dependent on the strength of the field, and said output means comprises collector means in the path of the deflected beam for producing a current which is a measure of the signal amplitude of the propagated beam.

7. The control device of claim 1, in which the propagated waves are utilized to cause deflection of an electron beam the intensity of which is modulated with oscillations of a lower frequency, said wafer of semiconductive material being disposed at said given point along the wave boundary of said medium and near the outer edge of said beam and having a length less than a half-wavelength of the higher frequency in the direction of wave propagation, the normal electric field component of one polarity which in non-linear fashion penetrates through said wafer being utilized for deflecting said beam by an amount depending on the strength of said field and said output means including collection means for selecting from the deflected beam a wave of a frequency which is a combination of said high and low frequencies.

References Cited in the file of this patent

UNITED STATES PATENTS 2,928,056 Lampert ---------------- Mar. 8, 1960